US012652529B2

(12) United States Patent
Ohashi et al.

(10) Patent No.: US 12,652,529 B2
(45) Date of Patent: Jun. 9, 2026

(54) CONTROL DEVICE, SYSTEM, AND NON-TRANSITORY COMPUTER READABLE STORAGE MEDIUM FOR PERFORMING CONTROL ACCORDING TO A FAILURE FACTOR

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Yosuke Ohashi, Aichi (JP); Yuya Goto, Aichi-ken (JP); Hiroki Okada, Aichi-ken (JP); Satoshi Ozawa, Aichi-ken (JP); Takanori Matsuyama, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 585 days.

(21) Appl. No.: 17/715,439

(22) Filed: Apr. 7, 2022

(65) Prior Publication Data

US 2022/0338007 A1 Oct. 20, 2022

(30) Foreign Application Priority Data

Apr. 14, 2021 (JP) ................................. 2021-068330

(51) Int. Cl.
| | |
|---|---|
| *H04W 12/06* | (2021.01) |
| *H04W 4/02* | (2018.01) |
| *H04W 12/037* | (2021.01) |

(52) U.S. Cl.
CPC ........... *H04W 12/06* (2013.01); *H04W 4/023* (2013.01); *H04W 12/037* (2021.01)

(58) Field of Classification Search
CPC .... H04W 12/06; H04W 4/023; H04W 12/037
See application file for complete search history.

(56) References Cited

U.S. PATENT DOCUMENTS

| | | | | |
|---|---|---|---|---|
| 2006/0125858 | A1* | 6/2006 | Silverbrook | ........... B41J 2/2139 |
| | | | | 347/12 |
| 2010/0197272 | A1* | 8/2010 | Karaoguz | ............. H04W 12/08 |
| | | | | 455/411 |

(Continued)

FOREIGN PATENT DOCUMENTS

| | | | | |
|---|---|---|---|---|
| DE | 112019001523 T5 * | 1/2021 | ........... G01S 13/765 |
| EP | 208231 B1 * | 8/1992 | ......... G07B 17/0008 |

(Continued)

OTHER PUBLICATIONS

Authors: Ian Gresham et al. Ultra-Wideband Radar Sensors for Short-Range Vehicular Applications Published: Sep. 2004 IEEE Transactions on Microwave Theory and Techniques, vol. 52, No. 9 (Year: 2004).*

*Primary Examiner* — Hadi S Armouche
(74) *Attorney, Agent, or Firm* — Greenblum & Bernstein, P.L.C.

(57) ABSTRACT

A control device comprising: a wireless communication unit configured to transmit or receive a radio signal conforming to a first communication standard to or from a portable device; and a control unit configured to perform control of an operation of a control target device on the basis of a result of authentication based on the radio signal conforming to the first communication standard, and a result of prescribed processing based on a radio signal conforming to a second communication standard, the radio signal conforming to the second communication standard being transmitted or received between at least one communication control device mounted on a mobile object and the portable device, wherein the control unit receives encrypted data at least indicating (Continued)

1 success or failure of the prescribed processing, and performs control of the operation of the control target device on the basis of content of the encrypted data.

10 Claims, 4 Drawing Sheets

(56)                References Cited

U.S. PATENT DOCUMENTS

| | | | | |
|---|---|---|---|---|
| 2014/0114504 | A1* | 4/2014 | Yamashita | G06F 7/00 |
| | | | | 701/2 |
| 2014/0308971 | A1* | 10/2014 | O'Brien | H04W 4/023 |
| | | | | 455/456.1 |
| 2017/0325276 | A1* | 11/2017 | Aminaka | H04W 76/12 |
| 2018/0099643 | A1* | 4/2018 | Golsch | G01S 13/765 |
| 2018/0234797 | A1* | 8/2018 | Ledvina | B60R 25/24 |
| 2019/0016340 | A1* | 1/2019 | Bae | B60W 30/18109 |
| 2019/0036625 | A1* | 1/2019 | Tsujita | H04L 1/0045 |
| 2019/0256047 | A1 | 8/2019 | Iwashita et al. | |
| 2020/0014526 | A1 | 1/2020 | Hammerschmidt et al. | |
| 2020/0084625 | A1 | 3/2020 | Kosugi et al. | |
| 2020/0198580 | A1* | 6/2020 | Saleh | B60R 25/24 |
| 2020/0307555 | A1* | 10/2020 | Van Wiemeersch | B60W 30/06 |
| 2020/0398787 | A1* | 12/2020 | Kong | B60R 25/245 |
| 2021/0061278 | A1* | 3/2021 | Zhao | G01C 21/3492 |
| 2021/0105573 | A1* | 4/2021 | Tokunaga | H04W 4/029 |
| 2021/0160658 | A1* | 5/2021 | Mars | H04L 9/3213 |
| 2021/0402955 | A1* | 12/2021 | Ahmed | B60R 25/01 |
| 2022/0063665 | A1* | 3/2022 | Golgiri | B60W 50/14 |
| 2022/0126788 | A1* | 4/2022 | Hassani | B60R 25/209 |
| 2022/0214419 | A1* | 7/2022 | Ryu | G01S 13/876 |
| 2022/0217534 | A1 | 7/2022 | Kosugi et al. | |
| 2022/0221550 | A1* | 7/2022 | Hága | G01S 13/0209 |
| 2022/0225054 | A1* | 7/2022 | Kim | G06V 40/10 |
| 2022/0286809 | A1* | 9/2022 | Hasegawa | H04W 76/15 |
| 2022/0300595 | A1* | 9/2022 | Hansen | G06F 21/35 |
| 2022/0301371 | A1* | 9/2022 | Tertinek | H04W 12/06 |
| 2022/0322029 | A1* | 10/2022 | Smith | A44B 15/005 |
| 2022/0322085 | A1* | 10/2022 | De Vegt | G07C 9/00309 |
| 2022/0337986 | A1* | 10/2022 | Cheong | H04W 4/80 |
| 2023/0156424 | A1* | 5/2023 | Lee | H04W 4/80 |
| | | | | 455/456.1 |
| 2023/0158912 | A1* | 5/2023 | Lombardo | H02J 50/90 |
| | | | | 701/22 |
| 2023/0188930 | A1* | 6/2023 | Knott | H04W 4/023 |
| | | | | 455/1 |
| 2023/0194695 | A1* | 6/2023 | Janssens | G01S 13/76 |
| | | | | 342/27 |
| 2023/0260393 | A1* | 8/2023 | Boenisch | G08G 1/052 |
| | | | | 701/117 |
| 2024/0059249 | A1* | 2/2024 | Ette | B60R 25/01 |

FOREIGN PATENT DOCUMENTS

| | | | | | |
|---|---|---|---|---|---|
| EP | | 3474238 | A1 * | 4/2019 | B60R 25/24 |
| EP | | 3962217 | A1 * | 3/2022 | H04W 72/1215 |
| EP | | 4007317 | A1 * | 6/2022 | B60R 25/24 |
| EP | | 3792121 | B1 * | 5/2023 | B60R 25/24 |
| EP | | 4174519 | A1 * | 5/2023 | G01S 13/0209 |
| JP | | 3674602 | B2 * | 7/2005 | |
| JP | | 2018-071190 | A | 5/2018 | |
| JP | | 2020-017947 | A | 1/2020 | |
| JP | | 2020-043381 | | 3/2020 | |
| JP | | 2020-067396 | A | 4/2020 | |
| JP | | 2020-118030 | A | 8/2020 | |
| JP | | 2020-173796 | | 10/2020 | |
| JP | | 2022053006 | A * | 4/2022 | G01S 13/765 |
| JP | | 2022136612 | A * | 9/2022 | G07C 5/008 |
| WO | WO-2016044123 | A1 * | 3/2016 | H05B 37/0272 | |
| WO | WO-2019067105 | A1 * | 4/2019 | B60R 25/246 | |
| WO | WO-2019227389 | A1 * | 12/2019 | E05B 47/00 | |
| WO | WO-2021148373 | A1 * | 7/2021 | G08B 13/19686 | |
| WO | WO-2023032277 | A1 * | 3/2023 | | |

* cited by examiner

Figure 4:
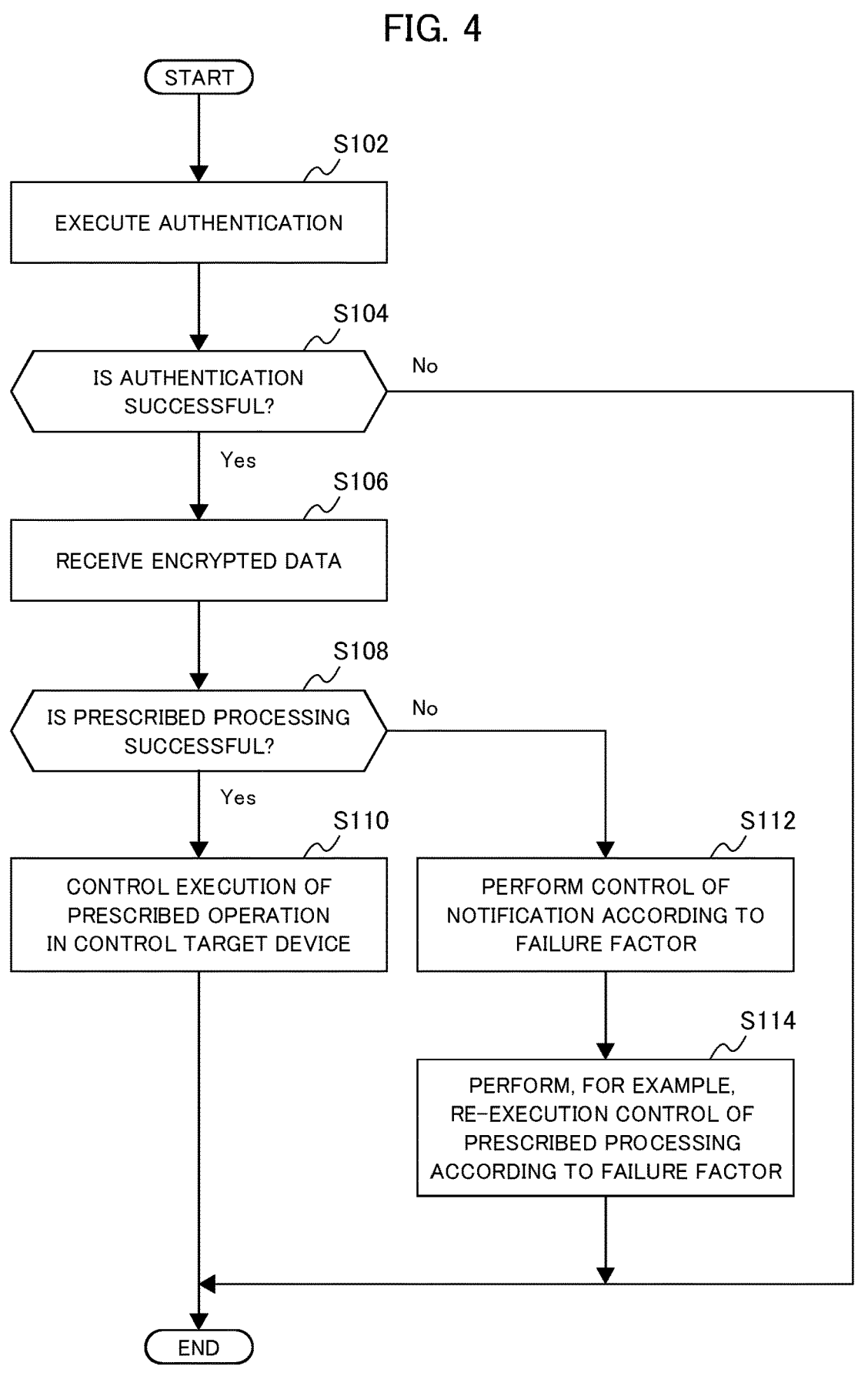

START

S102

EXECUTE AUTHENTICATION

S104

IS AUTHENTICATION
SUCCESSFUL?

No

Yes

S106

RECEIVE ENCRYPTED DATA

S108

IS PRESCRIBED PROCESSING
SUCCESSFUL?

No

Yes

S110

CONTROL EXECUTION OF
PRESCRIBED OPERATION
IN CONTROL TARGET DEVICE

S112

PERFORM CONTROL OF
NOTIFICATION ACCORDING TO
FAILURE FACTOR

S114

PERFORM, FOR EXAMPLE,
RE-EXECUTION CONTROL OF
PRESCRIBED PROCESSING
ACCORDING TO FAILURE FACTOR

END

CONTROL DEVICE, SYSTEM, AND NON-TRANSITORY COMPUTER READABLE STORAGE MEDIUM FOR PERFORMING CONTROL ACCORDING TO A FAILURE FACTOR

CROSS REFERENCE TO RELATED APPLICATION(S)

This application is based upon and claims benefit of priority from Japanese Patent Application No. 2021-068330, filed on Apr. 14, 2021, the entire contents of which are incorporated herein by reference.

BACKGROUND

The present invention relates to a control device, a system, and a non-transitory computer readable storage medium.

In recent years, technologies for performing various processing according to results of transmitting or receiving radio signals between devices have been developed. For example, JP2020-118030A discloses a technology for performing distance measurement between devices using an ultra wide band (UWB) signal and performing vehicle control on the basis of a result of the distance measurement.

SUMMARY

In the system as described above, security is expected to be improved by encrypting and transmitting or receiving the result of the distance measurement between a configuration for executing the distance measurement and a configuration for performing vehicle control. However, when the result of the distance measurement is encrypted each time, responsiveness is degraded.

Therefore, the present invention has been made in view of the above problem, and an object of the present invention is to improve responsiveness while ensuring security.

To solve the above described problem, according to an aspect of the present invention, there is provided a control device mounted on a mobile object, the control device comprising: a wireless communication unit configured to transmit or receive a radio signal conforming to a first communication standard to or from a portable device carried by a user who uses the mobile object; and a control unit configured to perform control of an operation of a control target device mounted on the mobile object on the basis of a result of authentication based on the radio signal conforming to the first communication standard, and a result of prescribed processing based on a radio signal conforming to a second communication standard different from the first communication standard, the radio signal conforming to the second communication standard being transmitted or received between at least one communication control device mounted on the mobile object and the portable device, wherein the control unit receives encrypted data at least indicating success or failure of the prescribed processing, and performs control of the operation of the control target device on the basis of content of the encrypted data.

To solve the above described problem, according to another aspect of the present invention, there is provided a system comprising: the control device; the at least one communication control device; and the portable device.

To solve the above described problem, according to another aspect of the present invention, there is provided A non-transitory computer readable storage medium having a program stored therein, the program causing a computer to function as a control device mounted on a mobile object; causing the control device to realize a wireless communication function for transmitting or receiving a radio signal conforming to a first communication standard to or from a portable device carried by a user who uses the mobile object, and a control function for performing control of an operation of a control target device mounted on the mobile object on the basis of a result of authentication based on the radio signal conforming to the first communication standard, and a result of prescribed processing based on a radio signal conforming to a second communication standard different from the first communication standard, the radio signal conforming to the second communication standard being transmitted or received between at least one communication control device mounted on the mobile object and the portable device; and causing the control function to perform control of the operation of the control target device on the basis of content of received encrypted data at least indicating success or failure of the prescribed processing.

As described above, according to the present invention, it is possible to improve responsiveness while ensuring security.

BRIEF DESCRIPTION OF THE DRAWINGS

FIG. 1 is a block diagram illustrating a configuration example of a system 1 according to an embodiment of the present invention.

FIG. 4 is a flowchart illustrating an example of a flow of control in a control unit 120 according to the embodiment.

DETAILED DESCRIPTION OF THE INVENTION(S)

Figure 2:
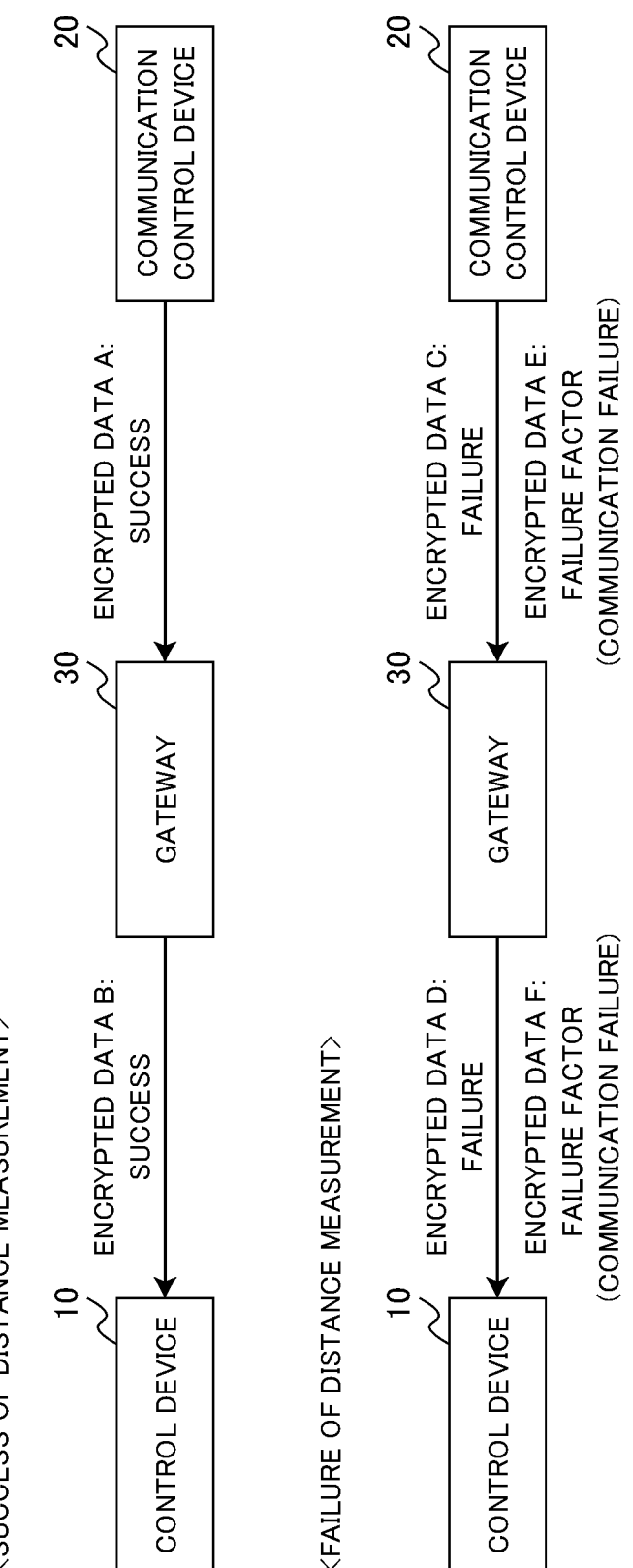
FIG. 2 is a diagram illustrating encrypted data according to the embodiment.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. EMBODIMENT

«1. System Configuration Example»

Figure 1:
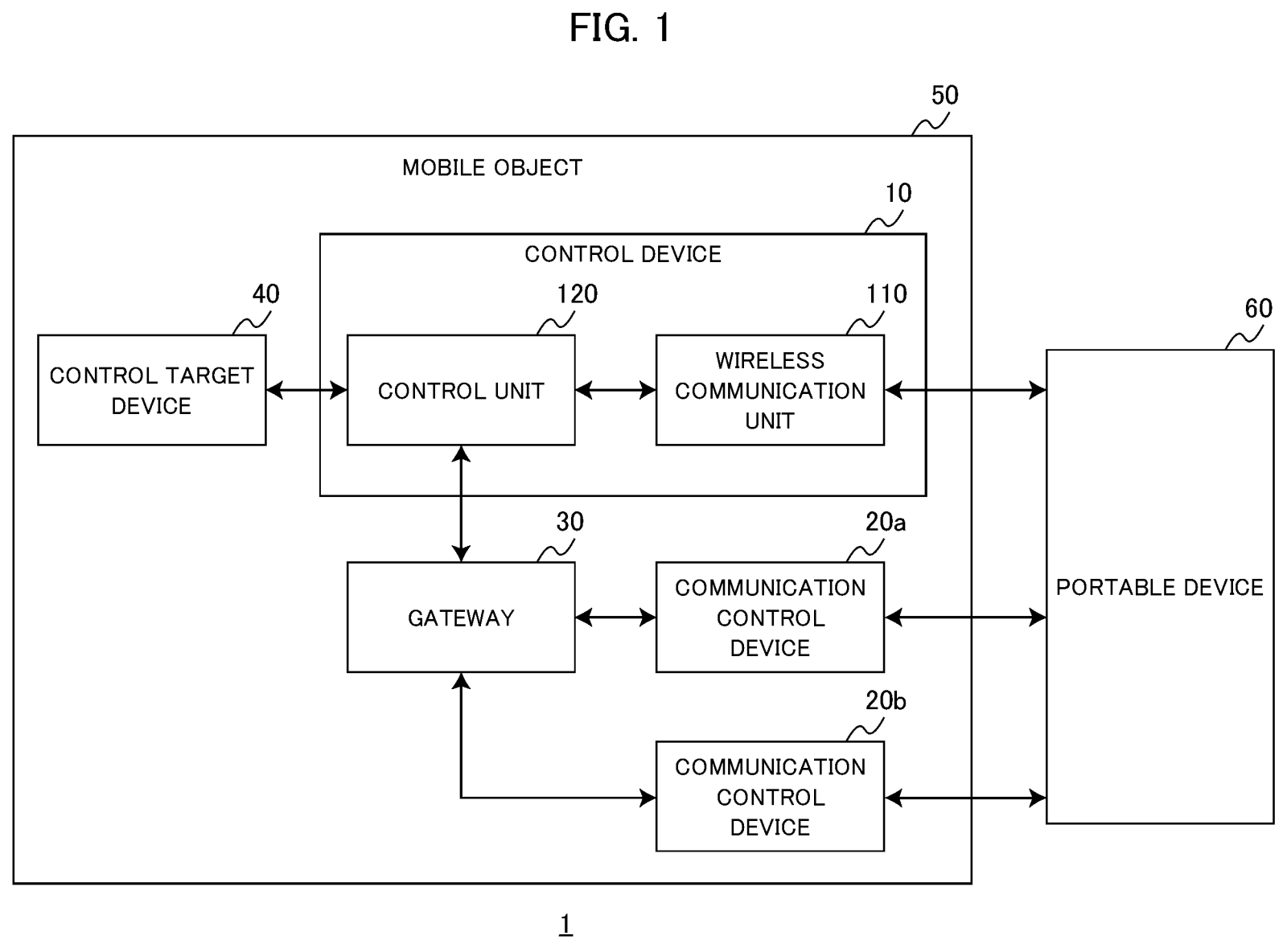

First, a configuration example of a system 1 according to an embodiment of the present invention will be described. FIG. 1 is a block diagram illustrating the configuration example of the system 1 according to the embodiment of the present invention.

As illustrated in FIG. 1, the system 1 according to the present embodiment may include a control device 10 mounted on a mobile object 50 such as a vehicle, at least one communication control device 20, a gateway 30, and a control target device 40.

Further, the system 1 according to the present embodiment may include a portable device 60 that is carried by a user who uses the mobile object 50 (for example, an owner of the mobile object 50 or a person who is permitted by the owner to use the mobile object 50).

(Control Device 10)

As illustrated in FIG. 1, the control device 10 according to the present embodiment may include a wireless communication unit 110 and a control unit 120.

(Wireless Communication Unit 110)

The wireless communication unit 110 according to the present embodiment transmits or receives a radio signal conforming to a first communication standard to or from the portable device 60 under the control of the control unit 120.

Therefore, the wireless communication unit 110 according to the present embodiment includes an antenna for transmitting the radio signal conforming to the first communication standard and an antenna for receiving the radio signal.

As the radio signal conforming to the first communication standard according to the present embodiment, for example, a low frequency (LF) band signal or an ultra-high frequency (UHF) band signal may be used.

(Control Unit 120)

The control unit 120 according to the present embodiment performs authentication of the portable device 60 on the basis of the radio signal transmitted or received by the wireless communication unit 110.

As an example, the control unit 120 according to the present embodiment causes the wireless communication unit 110 to transmit an authentication request, and causes the wireless communication unit 110 to receive an authentication response transmitted as a response to the authentication request by the portable device 60.

The authentication request may be a signal for requesting information necessary for authentication related to authenticity of the portable device 60, and the authentication request may be a signal including the information necessary for authentication.

Examples of the information necessary for authentication may include an identifier of the portable device 60, a predetermined password, key information, and a result of calculation using a hash function.

Further, the control unit 120 according to the present embodiment performs control of an operation of the control target device 40 mounted on the mobile object 50 on the basis of the result of the authentication based on the authentication response as described above, and a result of prescribed processing based on a radio signal conforming to a second communication standard different from the first communication standard transmitted or received between the at least one communication control device 20 and the portable device 60.

In this case, one characteristic of the control unit 120 according to the present embodiment is that the control unit 120 receives encrypted data at least indicating the success or failure of the prescribed processing, and performs the control of the operation of the control target device 40 on the basis of content of the encrypted data.

Here, the success of the prescribed processing means that a value acquired through the prescribed processing satisfies a prescribed condition, and the failure of the prescribed processing means that a result acquired through the prescribed processing does not satisfy the prescribed condition.

According to the encrypted data as described above, it is possible to improve responsiveness as compared with a case in which the communication control device 20 encrypts and transmits the value acquired through the prescribed processing each time and the control unit 120 determines whether or not the prescribed processing succeeds or fails on the basis of the encrypted value.

Functions of the control unit 120 according to the present embodiment are realized by various processors. Details of the functions of the control unit 120 according to the present embodiment will be described separately.

(Communication Control Device 20)

The mobile object 50 according to the present embodiment has the at least one communication control device 20 mounted thereon.

In the case of the example illustrated in FIG. 1, the mobile object 50 has two communication control devices 20a and 20b mounted thereon.

The communication control device 20 according to the present embodiment transmits or receives a radio signal conforming to the second communication standard to or from the portable device 60.

Therefore, the communication control device 20 according to the present embodiment includes an antenna capable of transmitting or receiving the radio signal conforming to the second communication standard.

Further, the communication control device 20 according to the present embodiment executes the prescribed processing based on the radio signal conforming to the second communication standard.

The prescribed processing according to the present embodiment may be, for example, processing for estimating a positional relationship between the communication control device 20 and the portable device 60.

Examples of the processing for estimating the positional relationship may include distance measurement for estimating a distance between the communication control device 20 and the portable device 60.

The distance measurement is executed on the basis of, for example, a first distance measurement signal transmitted by one of the communication control device 20 and the portable device 60, and a second distance measurement signal transmitted by the other of the communication control device 20 and the portable device 60 as a response to the first distance measurement signal.

Here, it is assumed that the communication control device 20 transmits the first distance measurement signal, and the portable device 60 transmits the second distance measurement signal as a response to the received first distance measurement signal.

In this case, the communication control device 20 can calculate a distance measurement value that is an estimated value of the distance between the communication control device 20 and the portable device 60 on the basis of a time $\Delta T1$ from a time when the first distance measurement signal is transmitted to a time when the second distance measurement signal is received, and a time $\Delta T2$ from a time when the portable device 60 receives the first distance measurement signal to a time when the portable device 60 transmits the second distance measurement signal.

More specifically, the communication control device 20 can calculate a time required for propagation of the first distance measurement signal and the second distance measurement signal (that is, a time required for round-trip communication) by subtracting the time $\Delta T2$ from the time $\Delta T1$, and can calculate a time required for propagation of any one of the first distance measurement signal and the second distance measurement signal (that is, a time required for one-way communication) by dividing the time required for propagation of the first distance measurement signal and the second distance measurement signal by 2.

Further, the communication control device 20 can calculate the distance measurement value by multiplying a value of (time $\Delta T1$–time $\Delta T2$)/2 by a speed of a signal.

5

In the case of the above-described example, the portable device 60 may transmit information on the time ΔT2, with the information included in the second distance measurement signal, or may transmit the information on the time ΔT2, with the information included in a signal separate from the second distance measurement signal.

On the other hand, the portable device 60 can also calculate the distance measurement value by receiving information regarding the time ΔT1 from the communication control device 20. In this case, the portable device 60 may transmit the calculated distance measurement value to the communication control device 20.

A sequence of the distance measurement according to the present embodiment can be flexibly modified.

Further, the processing for estimating the positional relationship according to the present embodiment is not limited to the distance measurement.

The processing for estimating the positional relationship according to the present embodiment may be, for example, processing for estimating an angle or position coordinates of the portable device 60 with reference to the communication control device 20.

As the second communication standard according to the present embodiment, various communication standards that can be used for estimation of the positional relationship as described above may be adopted.

As an example, the second communication standard according to the present embodiment may be ultra wide band wireless communication.

(Gateway 30)

The gateway 30 according to the present embodiment mediates wired communication between the at least one communication control device 20 and the control device 10.

(Control Target Device 40)

The control target device 40 according to the present embodiment may be any of various devices mounted on the mobile object 50.

The control target device 40 according to the present embodiment may be, for example, a locking device that controls unlocking and locking of a door of the mobile object 50, or an engine.

Further, the control target device 40 according to the present embodiment executes a prescribed operation under the control of the control unit 120.

For example, when the authentication is successful (the authenticity of the portable device 60 is recognized) and the received encrypted data indicates success of the prescribed processing, the control unit 120 may cause the locking device to execute unlocking of the door as the prescribed operation or may cause the engine to execute start-up as the prescribed operation.

(Portable Device 60)

The portable device 60 according to the present embodiment is carried by the user who uses the mobile object 50.

The portable device 60 according to the present embodiment transmits or receives the radio signal conforming to the first communication standard to or from the control device 10 mounted on the mobile object 50.

Therefore, the portable device 60 according to the present embodiment includes an antenna that transmits the radio signal conforming to the first communication standard and an antenna that receives the radio signal.

Further, the portable device 60 according to the present embodiment transmits or receives the radio signal conforming to the second communication standard to or from the at least one communication control device 20 mounted on the mobile object 50.

Therefore, the portable device 60 according to the present embodiment includes an antenna that transmits or receives a radio signal conforming to the second communication standard.

Further, the portable device 60 according to the present embodiment may include an operation reception unit that receives an operation from the user, a notification unit that notifies a user of various types of information, and the like.

The notification unit includes, for example, a display that displays a notification, and a speaker that outputs a notification by voice.

The configuration example of the system 1 according to the present embodiment has been described above. The configuration described with reference to FIG. 1 is merely an example, and the configuration of the system 1 according to the present embodiment is not limited to such an example.

For example, the system 1 according to the present embodiment does not necessarily have to include the gateway 30. In this case, the control device 10 and the communication control device 20 may directly perform wired communication.

A configuration of the system 1 according to the present embodiment can be flexibly modified according to a specification or operation.

《1.2. Details》

Next, control based on the encrypted data according to the present embodiment will be described in detail.

As described above, the control unit 120 of the control device 10 according to the present embodiment performs the control of the operation of the control target device 40 on the basis of a result of the authentication based on the radio signal conforming to the first communication standard and a result of the prescribed processing based on the radio signal conforming to the second communication standard.

For example, in a case in which the distance measurement is executed as the prescribed processing, the control unit 120 may cause the control target device 40 to execute the prescribed operation when the authenticity of the portable device 60 is recognized in the authentication (the authentication is successful) and the distance measurement value is equal to or smaller than a prescribed value (the distance measurement has been successful).

In this case, it is also possible for the communication control device 20 to encrypt the obtained distance measurement value each time and then transmit the resultant value to the gateway 30 or the control device 10.

In this case, the control unit 120 of the control device 10 can determine whether or not the distance measurement is successful by decoding the received encrypted distance measurement value and comparing the resultant distance measurement value with the prescribed value.

However, when the distance measurement value is encrypted each time and then transmitted or received as described above, a time required for the encryption and decryption processing is increased and the responsiveness is degraded.

The present technical idea has been conceived by paying attention to the point as described above, and makes it possible to improve responsiveness while ensuring security.

Therefore, the communication control device 20 according to the present embodiment may generate an encrypted solution using advanced encryption standard (AES) or the like on the basis of a random number received in advance from the control device 10, and transmit a part of the encrypted solution as encrypted data indicating the success or failure of the prescribed processing.

Hereinafter, a case in which the prescribed processing is distance measurement will be described as a main example.

The communication control device 20 according to the present embodiment transmits or receives the radio signal conforming to the second communication standard to or from the portable device 60, and executes distance measurement on the basis of the radio signal.

Then, the communication control device 20 according to the present embodiment compares the distance measurement value obtained through the distance measurement with the prescribed value, and determines whether or not the distance measurement is successful.

Further, the communication control device 20 according to the present embodiment transmits the encrypted data prepared in advance, on the basis of a result of the determination.

FIG. 2 is a diagram illustrating the encrypted data according to the present embodiment.

An upper part of FIG. 2 illustrates a flow of the encrypted data when distance measurement is successful.

When the communication control device 20 according to the present embodiment determines that the distance measurement is successful, the communication control device 20 transmits the encrypted data indicating the success of the distance measurement to the gateway 30.

In this case, the encrypted data indicating the success of the distance measurement may be encrypted data shared in advance between the communication control device 20 and the gateway 30. Here, the encrypted data is referred to as encrypted data A.

The gateway 30 transmits encrypted data B indicating the success of the distance measurement shared in advance with the control device 10 to the control device 10 on the basis of the received encrypted data A.

In this case, the control unit 120 of the control device 10 can recognize the success of the distance measurement on the basis of the received encrypted data B.

On the other hand, a lower part of FIG. 2 illustrates a flow of the encrypted data when distance measurement fails.

In the case of an example illustrated in the lower part of FIG. 2, the communication control device 20 transmits encrypted data C indicating the failure of the distance measurement shared in advance between the communication control device 20 and the gateway 30 to the gateway 30.

The gateway 30 transmits encrypted data D indicating the failure of the distance measurement shared in advance with the control device 10 to the control device 10 on the basis of the received encrypted data C.

In this case, the control unit 120 of the control device 10 can recognize the failure of the distance measurement on the basis of the received encrypted data D.

Further, the encrypted data according to the present embodiment may include a failure factor indicating a failure factor of the prescribed processing such as distance measurement.

For example, in the lower part of FIG. 2, a flow of the encrypted data when communication between the communication control device 20 and the portable device 60 fails due to an influence of noise or the like is illustrated.

In this case, the communication control device 20 may transmit, to the gateway 30, encrypted data E indicating that a failure factor shared in advance between the communication control device 20 and the gateway 30 is the failure of communication, in addition to or instead of the encrypted data C indicating the failure of the distance measurement.

The gateway 30 may transmit, to the control device 10, encrypted data F indicating that the failure factor shared in advance with the control device 10 is the failure of communication, in addition to or instead of the encrypted data D, on the basis of the received encrypted data E.

In this case, the control unit 120 of the control device 10 can recognize that the failure factor of the failure of the distance measurement is the failure of the communication on the basis of the received encrypted data F.

The example of the encrypted data according to the present embodiment has been described above with reference to FIG. 2.

According to the encrypted data and the flow of the encrypted data as described above, it is possible to greatly reduce a time required for encryption and decryption and improve the responsiveness as compared with the case in which the distance measurement value is encrypted each time.

A format of the encrypted data according to the present embodiment is not limited to the example described with reference to FIG. 2.

For example, the encrypted data according to the present embodiment may be data in which the success of the prescribed processing, the failure of the prescribed processing, and the failure factor are represented using bit positions.

Figure 3:
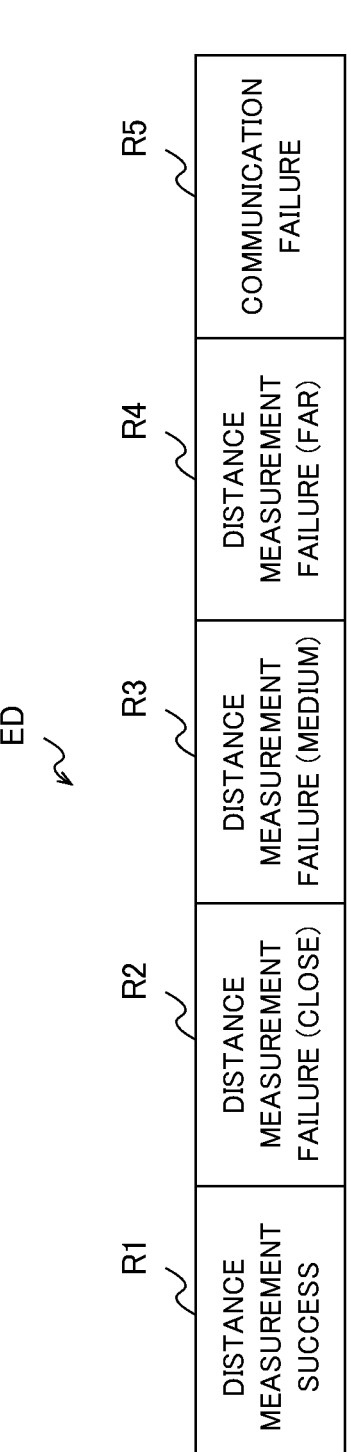
FIG. 3 is a diagram illustrating the encrypted data in which success of prescribed processing, failure of prescribed processing, and a failure factor according to the embodiment are represented using bit positions.

For example, encrypted data ED illustrated in FIG. 3 has a prescribed bit length and has five regions in order from a first bit.

The number of regions included in the encrypted data ED may be determined depending on the number of failure factors related to the prescribed processing.

In the case of the example illustrated in FIG. 3, a first region R1 may be a region indicating the success of the distance measurement.

A second region R2 may be a region indicating a case in which the distance measurement fails and the failure factor is that the distance measurement value exceeds the prescribed value and a difference between the distance measurement value and the prescribed value is relatively small, that is, a distance between the communication control device 20 and the portable device 60 exceeds a prescribed distance but is relatively short.

A third region R3 may be a region indicating a case in which the distance measurement fails and the failure factor is that the distance measurement value exceeds the prescribed value and the difference between the distance measurement value and the prescribed value is medium, that is, the distance between the communication control device 20 and the portable device 60 exceeds the prescribed distance but is medium.

A fourth region R4 may be a region indicating a case in which the distance measurement fails and the failure factor is that the distance measurement value exceeds the prescribed value and the difference between the distance measurement value and the prescribed value is relatively large, that is, the distance between the communication control device 20 and the portable device 60 exceeds the prescribed distance but is relatively long.

A fifth region R5 may be a region indicating that the distance measurement fails and that the failure factor is failure of the communication between the communication control device 20 and the portable device 60.

A bit string in the first region R1 to the fifth region R5 as described above is shared among the control device 10, the communication control device 20, and the gateway 30.

In this case, a result of the distance measurement may be shown by changing the bit string of the corresponding region using a method shared in advance.

The above changes include, for example, bit inversion, bit addition, bit extraction.

For example, when the failure factor of the distance measurement is the failure of the communication between the communication control device 20 and the portable device 60, the communication control device 20 may transmit the encrypted data ED obtained by extracting a partial bit string from the bit string in the fifth region R5.

In this case, the control unit 120 of the control device 10 can recognize that the distance measurement fails and the failure factor is failure of the communication, by detecting that some bits are extracted in the fifth region R5 of the received encrypted data ED.

The encrypted data according to the present embodiment has been described above with specific examples. As described above, the system 1 according to the present embodiment can improve the responsiveness while ensuring security by transmitting or receiving the encrypted data in a format shared in advance between the devices.

Next, a flow of control in the control unit 120 of the control device 10 according to the present embodiment will be described with an example.

FIG. 4 is a flowchart illustrating an example of a flow of control in the control unit 120 according to the present embodiment.

In the case of the example illustrated in FIG. 4, the control unit 120 first causes the wireless communication unit 110 to transmit the authentication request, and executes authentication based on the authentication response that the wireless communication unit 110 has received as the response to the authentication request from the portable device 60 (S102).

Here, when the authentication fails (S104: No), that is, when the authenticity of the portable device 60 is not recognized on the basis of the authentication request, the control unit 120 performs control to end a series of processing related to the control of the operation of the control target device 40 or to cause the wireless communication unit 110 to retransmit the authentication request.

On the other hand, when the authentication is successful (S104: Yes), the control unit 120 determines whether or not the encrypted data received in step S106 indicates the success of the prescribed processing (S108).

Here, when the encrypted data indicates the success of the prescribed processing (S108: Yes), the control unit 120 causes the control target device 40 to execute the prescribed operation (S110).

On the other hand, when the encrypted data indicates failure of the prescribed processing (S108: No), the control unit 120 may perform control so that a notification according to the failure factor to the user is performed (S112).

For example, when the encrypted data received in step S106 indicates that the failure factor is the failure of the communication between the communication control device 20 and the portable device 60, the control unit 120 may perform control so that a notification related to the failure of the communication to the user is performed.

Further, for example, when the encrypted data received in step S106 indicates that the failure factor is that the difference between the distance measurement value and the prescribed value is equal to or larger than a medium, that is, the distance between the communication control device 20 and the portable device 60 is equal to or larger than a medium, the control unit 120 may give a notification for instructing the portable device 60 to approach the mobile object 50 or the communication control device 20 to the user, and perform control.

The notification as described above may be output by, for example, a navigation device mounted on the mobile object 50, various displays, speakers, or a notification unit included in the portable device 60.

Further, the control unit 120 according to the present embodiment may perform control according to the failure factor, in addition to the notification as described above.

For example, the control unit 120 may perform, for example, re-execution control of the prescribed processing according to the factor of the failure, as illustrated in FIG. 4 (S114).

As an example, when the encrypted data received in step S106 indicates that the failure factor is that the difference between the distance measurement value and the prescribed value is relatively small, that is, the distance between the communication control device 20 and the portable device 60 is relatively small, the control unit 120 may perform control so that re-execution of the authentication is not performed, but only the prescribed processing is re-executed.

More specifically, the control unit 120 may perform control so that re-execution of transmission or reception of a signal to be used for authentication is not performed, but only transmission or reception of a signal to be used for distance measurement, and distance measurement using the signal are re-executed.

The re-execution control of the prescribed processing as described above may be performed according to a sequence of the prescribed processing and the number of communication control devices 20.

For example, in a case in which the communication control device 20 mounted on the mobile object 50 performs a plurality of distance measurements, the control unit 120 may cause the control target device 40 to execute the prescribed operation without performing subsequent re-execution control of the distance measurement when the first distance measurement is successful and then a failure factor in any one of the distance measurements is that the difference between the distance measurement value and the prescribed value is relatively small.

More specifically, in a sequence in which a plurality of distance measurements is performed, when one of the distance measurements is successful and then the other distance measurement fails, the control unit 120 may allow the other distance measurement to fail and cause the control target device 40 to execute the prescribed operation when a failure factor of the other distance measurement indicates that the distance between the communication control device 20 and the portable device 60 is relatively small.

Further, for example, in a case in which each of a plurality of communication control devices 20 mounted on the mobile object 50 performs distance measurement, the control unit 120 may cause the control target device 40 to execute the prescribed operation without performing the subsequent re-execution control of the distance measurement when there are both of the success of the distance measurement and the failure factor indicating that the difference between the distance measurement value and the prescribed value is relatively small.

The control in the control unit 120 according to the present embodiment can be flexibly modified according to a specification or operation.

2. SUPPLEMENT

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Further, a series of processing in each device described in the present specification may be realized by a program stored in a non-transitory computer readable storage medium. Each program is read into a RAM at the time of execution in a computer and executed by a processor such as a CPU. The storage medium is, for example, a magnetic disk, an optical disc, a magneto-optical disc, or a flash memory. Further, the above program may be distributed, for example, via a network without use of the storage medium.

What is claimed is:

1. A control device mounted on a mobile object, the control device comprising:

a plurality of antennas configured to transmit or receive a radio signal conforming to a first communication standard to or from a portable device carried by a user who uses the mobile object; and a processor configured to perform control of an operation of a control target device mounted on the mobile object on the basis of a result of authentication based on the radio signal conforming to the first communication standard, and a result of prescribed processing based on a radio signal conforming to a second communication standard different from the first communication standard, the radio signal conforming to the second communication standard being transmitted or received between at least one communication control device mounted on the mobile object and the portable device, wherein the processor receives encrypted data at least indicating success or failure of the prescribed processing, and performs control of the operation of the control target device on the basis of content of the encrypted data, wherein the encrypted data includes information indicating that a wireless communication conforming to the second communication standard between the control device and the portable device has failed, wherein the processor receives the encrypted data including a failure factor indicating failure of the prescribed processing, and performs control according to the failure factor, wherein the encrypted data further includes a plurality of regions defined for each failure factor, and wherein a number of regions included the plurality of regions corresponds to a number of failure factors related to the prescribed processing.

2. The control device according to claim 1, wherein the processor receives the encrypted data in which success of the prescribed processing, failure of the prescribed processing, and the failure factor are represented by using bit positions, and performs control based on content of the encrypted data.

3. The control device according to claim 1, wherein the processor causes the control target device to execute a prescribed operation when the authentication is successful and the encrypted data indicates the success of the prescribed processing.

4. The control device according to claim 1, wherein the processor performs control so that a notification according to the failure factor to the user is performed when the encrypted data indicates failure of the prescribed processing.

5. The control device according to claim 1, wherein the prescribed processing includes processing for estimating a positional relationship between the communication control device and the portable device.

6. The control device according to claim 5, wherein the processing for estimating the positional relationship includes distance measurement for estimating a distance between the communication control device and the portable device.

7. The control device according to claim 1, wherein the second communication standard includes ultra wide band wireless communication.

8. A system comprising:

the control device according to claim 1;

the at least one communication control device; and the portable device.

9. A non-transitory computer readable storage medium having a program stored therein, the program causing a computer to function as a control device mounted on a mobile object;

causing the control device to realize a wireless communication function for transmitting or receiving a radio signal conforming to a first communication standard to or from a portable device carried by a user who uses the mobile object, and a control function for performing control of an operation of a control target device mounted on the mobile object on the basis of a result of authentication based on the radio signal conforming to the first communication standard, and a result of prescribed processing based on a radio signal conforming to a second communication standard different from the first communication standard, the radio signal conforming to the second communication standard being transmitted or received between at least one communication control device mounted on the mobile object and the portable device; and causing the control function to perform control of the operation of the control target device on the basis of content of received encrypted data at least indicating success or failure of the prescribed processing, wherein the encrypted data includes information indicating that a wireless communication conforming to the second communication standard between the control device and the portable device has failed, wherein the received encrypted data includes a failure factor indicating failure of the prescribed processing, wherein the control function performs control according to the failure factor, wherein the encrypted data further includes a plurality of regions defined for each failure factor, and wherein a number of regions included the plurality of regions corresponds to a number of failure factors related to the prescribed processing.

10. The control device according to claim 1, wherein the encrypted data indicates the failure factor by bit inversion, bit addition, or bit extraction.

* * * * *